United States Patent
Naruse

(10) Patent No.: US 10,800,214 B2
(45) Date of Patent: Oct. 13, 2020

(54) NOISE REDUCTION DEVICE AND PNEUMATIC TIRE PROVIDED WITH THE SAME

(71) Applicant: The Yokohama Rubber Co., LTD., Minato-ku, Tokyo (JP)

(72) Inventor: Masahiro Naruse, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 693 days.

(21) Appl. No.: 15/505,900

(22) PCT Filed: Aug. 10, 2015

(86) PCT No.: PCT/JP2015/072675
§ 371 (c)(1),
(2) Date: Feb. 22, 2017

(87) PCT Pub. No.: WO2016/027723
PCT Pub. Date: Feb. 25, 2016

(65) Prior Publication Data
US 2018/0215209 A1 Aug. 2, 2018

(30) Foreign Application Priority Data

Aug. 22, 2014 (JP) ................................. 2014-169867

(51) Int. Cl.
*B60C 5/00* (2006.01)
*B60C 19/00* (2006.01)
*B29D 30/06* (2006.01)

(52) U.S. Cl.
CPC ........ *B60C 19/002* (2013.01); *B29D 30/0681* (2013.01); *B60C 5/00* (2013.01)

(58) Field of Classification Search
CPC ......... B60C 5/00; B60C 19/002; B60C 19/12; B60C 19/122; B60C 19/125;
(Continued)

(56) References Cited

U.S. PATENT DOCUMENTS 3,949,796 A * 4/1976 Bartos .................... B60C 17/06
152/158
7,854,244 B2 * 12/2010 Tanno ................... B60C 19/002
152/155
(Continued)

FOREIGN PATENT DOCUMENTS

DE 4001753 A1 * 7/1991 ........... B60C 19/002
DE 10 2009 024 454 12/2010
(Continued)

OTHER PUBLICATIONS

International Search Report for International Application No. PCT/JP2015/072675 dated Oct. 6, 2015, 4 pages, Japan.

*Primary Examiner* — Edgardo San Martin
(74) *Attorney, Agent, or Firm* — Thorpe North & Western

(57) ABSTRACT

A noise reduction device (10) according to the present technology includes a band member (11) made of a thermoplastic resin formed into a ring shape along a tire inner surface, and a sound absorbing member (12) made of a porous material bonded to the band member (11). The sound absorbing member (12) is arranged to be fitted onto the tire inner surface with the help of an elastic restoring force of the band member (11), the band member (11) includes at least one raised portion (14) provided on an outer circumferential surface thereof, and the outer circumferential surface of the band member (11) has a contact area when in contact with a smooth surface in a range of from 10% to 80% of the projected area of the band member (11).

18 Claims, 7 Drawing Sheets

(58) Field of Classification Search
CPC ........ B29D 30/0681; B29D 2030/0682; B29D 2030/0683
See application file for complete search history.

(56) References Cited

U.S. PATENT DOCUMENTS

| | | | | |
|---|---|---|---|---|
| 8,430,143 | B2* | 4/2013 | Tanno | B60C 19/002 152/155 |
| 8,448,743 | B2* | 5/2013 | Tanno | B60C 19/002 152/157 |
| 8,839,905 | B2* | 9/2014 | Layfield | B60C 19/002 152/155 |
| 8,910,681 | B2* | 12/2014 | Tanno | B60C 19/002 152/157 |
| 10,384,494 | B2* | 8/2019 | Naruse | B60C 19/002 |
| 2005/0205183 | A1* | 9/2005 | Yukawa | B60C 19/002 152/450 |
| 2006/0231185 | A1 | 10/2006 | Tanno | |
| 2008/0099116 | A1* | 5/2008 | Tanno | B60C 19/002 152/454 |
| 2009/0314402 | A1* | 12/2009 | Kuramori | B60C 19/002 152/155 |
| 2009/0320980 | A1 | 12/2009 | Tanno | |
| 2010/0012243 | A1* | 1/2010 | Tanno | B60C 19/002 152/155 |
| 2010/0032073 | A1 | 2/2010 | Tanno et al. | |
| 2011/0220264 | A1* | 9/2011 | Nagai | B29D 30/0654 152/548 |
| 2012/0000588 | A1* | 1/2012 | Tanno | B29D 30/0061 152/450 |
| 2012/0325383 | A1 | 12/2012 | Moore et al. | |
| 2013/0098522 | A1 | 4/2013 | Tanno | |
| 2013/0098533 | A1 | 4/2013 | Tanno | |
| 2013/0248070 | A1 | 9/2013 | Tanno et al. | |
| 2013/0248080 | A1 | 9/2013 | Tanno et al. | |
| 2018/0215208 | A1* | 8/2018 | Kanenari | B29D 30/0681 |

FOREIGN PATENT DOCUMENTS

| | | |
|---|---|---|
| JP | 2005-104314 | 4/2005 |
| JP | 2006-306287 | 11/2006 |
| JP | 2006-335208 | 12/2006 |
| JP | 4175479 | 11/2008 |
| JP | 2010-089683 | 4/2010 |
| WO | WO 2005/012007 | 2/2005 |
| WO | WO 2006/118200 | 11/2006 |
| WO | WO 2006/118202 | 11/2006 |

* cited by examiner

NOISE REDUCTION DEVICE AND PNEUMATIC TIRE PROVIDED WITH THE SAME

TECHNICAL FIELD

The present technology relates to a noise reduction device fitted onto a tire inner surface and a pneumatic tire provided with the same. More specifically, the present technology relates to a noise reduction device that minimizes an increase in the temperature of a band member during travel and enables an improvement in high speed durability, and a pneumatic tire provided with the same.

BACKGROUND ART

One of the causes of the noises generated by a pneumatic tire is a cavernous resonance resulting from vibration of the air with which the tire is filled. When a tire is rolled, uneven road surfaces cause a tread portion to vibrate. The vibrations of the tread portion cause the air inside the tire to vibrate, which produces this cavernous resonance.

As a method for reducing noise caused by such cavernous resonance, providing a sound absorbing member within a cavity portion formed between the tire and the rim of the wheel has been proposed. More specifically, a noise reduction device is formed of a band member and a sound absorbing member, the band member being made of a thermoplastic resin formed into a ring shape along a tire inner surface and the sound absorbing member being made of a porous material and bonded to the band member. The sound absorbing member is installed in a region corresponding to the tread portion on a tire inner surface with the help of an elastic restoring force of the band member (refer to Japanese Patent No. 4175479 or International Patent Application Publication No. WO/2005/012007, for example).

Nevertheless, because the band member of the noise reduction device described above is made of a thermoplastic resin, heat generated in the pneumatic tire during travel is transmitted from the tire inner surface, decreasing a yield strength of the band member. Then, when the increase in travel speed significantly increases a centrifugal force applied to the band member while the yield strength of the band member is in this decreased state, the band member deforms, possibly resulting in band member failure.

SUMMARY

The present technology provides a noise reduction device that minimizes an increase in the temperature of a band member during travel and enables an improvement in high speed durability, and a pneumatic tire provided with the same.

A noise reduction device according to the present technology includes a band member made of a thermoplastic resin formed into a ring shape along a tire inner surface, and a sound absorbing member made of a porous material bonded to the band member. The sound absorbing member is arranged to be fitted onto the tire inner surface with the help of an elastic restoring force of the band member. The band member includes at least one raised portion provided on an outer circumferential surface thereof, and the outer circumferential surface of the band member has a contact area when in contact with a smooth surface in a range of from 10% to 80% of a projected area of the band member.

Additionally, a pneumatic tire of the present technology is provided with the noise reduction device in a cavity portion thereof.

According to the present technology, in the noise reduction device in which the sound absorbing member is arranged to be fitted onto the tire inner surface with the help of the elastic restoring force of the band member, at least one raised portion is provided on the outer circumferential surface of the band member, and the outer circumferential surface of the band member has a contact area when in contact with a smooth surface within the range of from 10% to 80% of the projected area of the band member. As a result, even if heat build-up occurs in the pneumatic tire during travel, the transmission of the heat from the tire inner surface and the increase in temperature of the band member are minimized, enabling an improvement in high speed durability of the noise reduction device.

In the present technology, a chamfered portion formed by a curved surface is preferably formed at an edge of the raised portion that comes into contact with the tire inner surface, the chamfered portion having a radius of curvature in a cross section in a band width direction and a radius of curvature in a cross section in a band circumferential direction of from 0.1 mm to 3.0 mm. This decreases the amount of damage to the tire inner surface caused by contact with the raised portion, making it possible to improve the durability of the pneumatic tire.

The raised portion preferably includes at least one raised portion that continuously extends in the circumferential direction of the band member. Further, the raised portion preferably includes a plurality of raised portions disposed intermittently and repetitively in the circumferential direction of the band member. Furthermore, the raised portion preferably includes a plurality of raised portions disposed side by side in the width direction of the band member. The raised portion in such an embodiment is provided to the band member, making it possible to effectively minimize the thermal conductivity from the tire inner surface to the band member.

A height of the raised portion is preferably from 50% to 100% of a thickness of a base portion constituting the band member. This effectively minimizes the thermal conductivity from the tire inner surface to the band member, making it possible to further improve the high speed durability.

Preferably, the sound absorbing member is disposed between the band member and a locking member made of a thermoplastic resin, and the locking member is thermally welded to the band member through the sound absorbing member, thereby fixing the sound absorbing member to the band member. This makes it possible to firmly fix the sound absorbing member to the band member made of a thermoplastic resin.

In the present technology, "contact area of the band member" refers to the sum of the contact areas of the band member and a smooth surface measured when the band member is extended on the smooth surface of a rigid body, such as a steel plate, arranged so that the outer circumferential surface comes into contact with the smooth surface, and subjected to a pressurizing force of 250 Pa applied toward the smooth surface. More specifically, the sum of the contact areas can be found by applying the pressurizing force with pressure-sensitive paper inserted between the smooth surface and the band member, and measuring the surface areas of contacted locations (colored locations). Examples of the pressure-sensitive paper include a pressure measurement film (Prescale) manufactured by FUJIFILM Corporation. On the other hand, "projected area of the band member" refers to the projected area measured when the band member is projected in a thickness direction.

DETAILED DESCRIPTION

Figure 1:
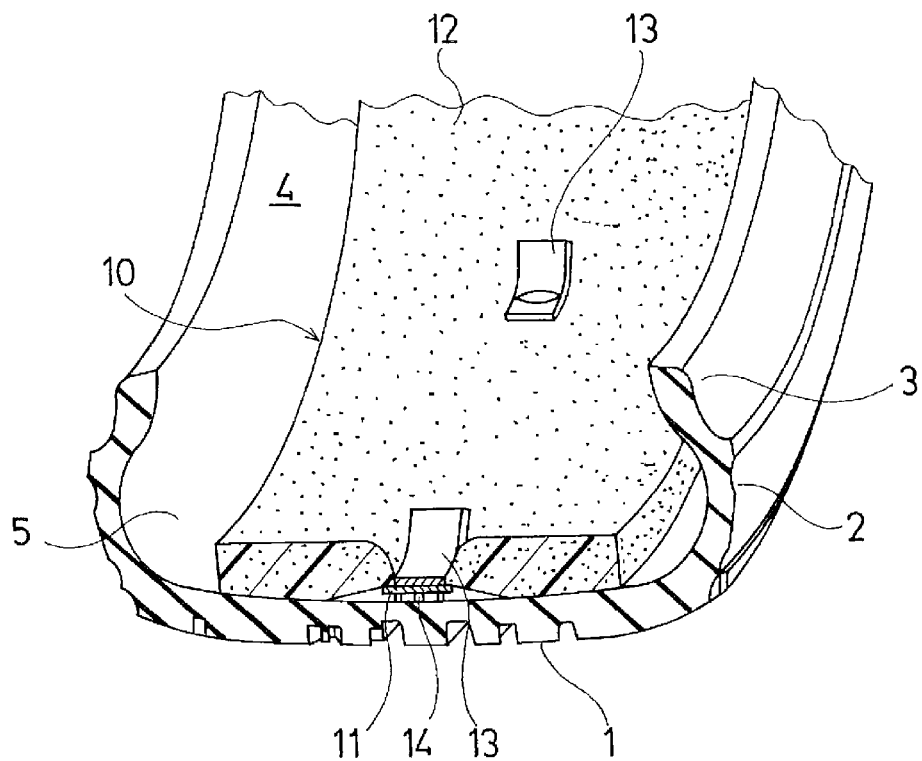
FIG. 1 is a perspective cross-sectional view illustrating a pneumatic tire provided with a noise reduction device according to an embodiment of the present technology.
Figure 2:
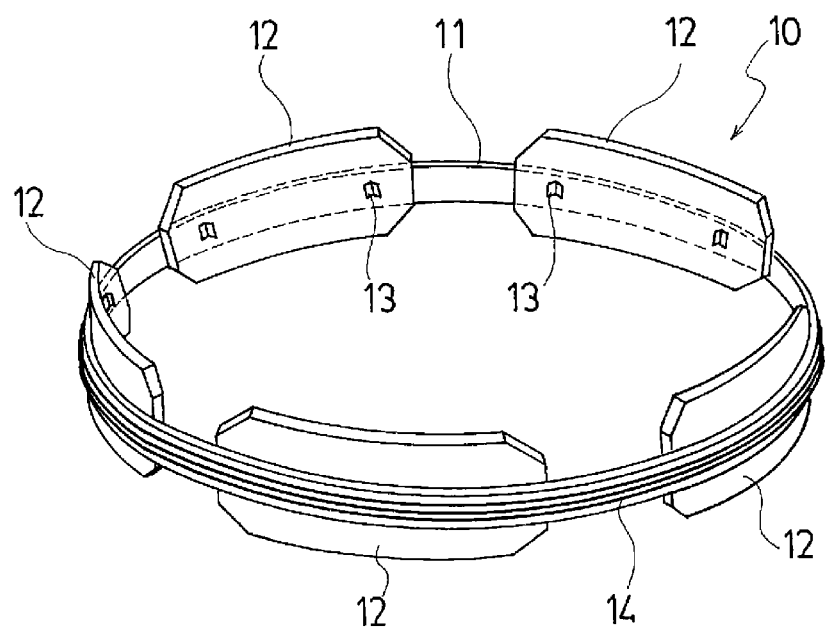
FIG. 2 is a perspective view illustrating the noise reduction device according to the embodiment of the present technology.

A configuration of the present technology will be described below in detail with reference to the accompanying drawings. FIG. 1 illustrates a pneumatic tire according to an embodiment of the present technology, and FIG. 2 illustrates a noise reduction device according to the embodiment of the present technology. As illustrated in FIG. 1, the pneumatic tire is provided with a tread portion 1 extending in a tire circumferential direction to form a ring shape, a pair of sidewall portions 2 disposed on both sides of the tread portion 1, and a pair of bead portions 3 disposed on inner sides in a tire radial direction of the sidewall portions 2. In addition, a noise reduction device 10 of a ring shape illustrated in FIG. 2 is fitted onto a cavity portion 4 surrounded by the tread portion 1, the sidewall portions 2, and the bead portions 3. This noise reduction device 10 is disposed in a region of a tire inner surface 5 corresponding to the tread portion 1.

The noise reduction device 10 includes a band member 11 made of a thermoplastic resin, and a plurality of sound absorbing members 12 made of a porous material. The band member 11 is formed into a ring shape along the tire inner surface 5, and the sound absorbing members 12 are bonded to the band member 11 so as to be spaced apart from each other in the circumferential direction of the band member 11. The sound absorbing members 12 each include a number of inner cells, and have predetermined sound absorbing properties based on the porous structure. Polyurethane foam is preferably used as the porous material of the sound absorbing member 12. The band member 11 retains each of the sound absorbing members 12 on the tire inner surface 5 with the help of an elastic restoring force. The noise reduction device 10 thus configured is freely attachable to and detachable from a regular pneumatic tire, and easily attached and detached.

In the noise reduction device 10 described above, the method utilized to bond the band member 11 and each of the sound absorbing members 12 is thermal welding using a locking member 13 made of a thermoplastic resin. That is, the sound absorbing member 12 is disposed between the band member 11 and the locking member 13, both being made of a thermoplastic resin, and the locking member 13 is thermally welded to the band member 11 through the sound absorbing member 12. It is preferable that the constituent material of the band member 11 and the constituent material of the locking member 13 be the same type of thermoplastic resin, such as polypropylene, for example.

Figure 3A:
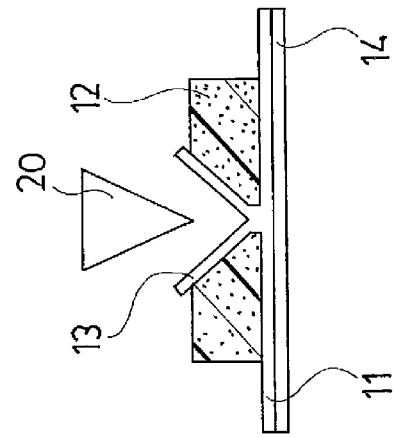
FIGS. 3A to 3C illustrate a method for bonding a sound absorbing member to a band member, each being a cross-sectional view of the corresponding step of the method.
Figure 3B:
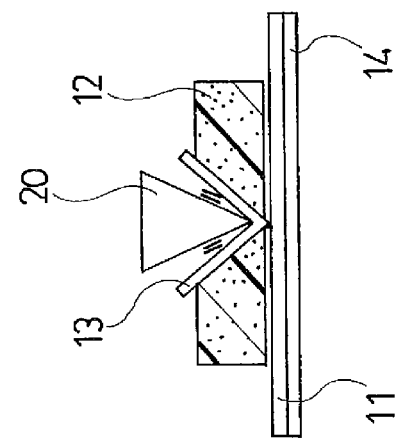
Figure 3C:
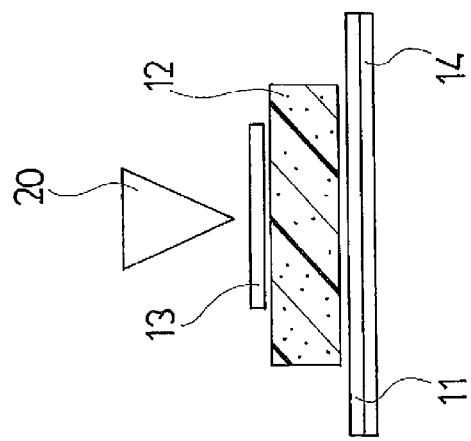

FIGS. 3A to 3C illustrate a method for bonding each of the sound absorbing members 12 to the band member 11. First, as illustrated in FIG. 3A, the sound absorbing member 12 is arranged between the band member 11 and the plate-shaped locking member 13. Next, as illustrated in FIG. 3B, a vibration horn 20 of an ultrasonic welding device is pressed onto the locking member 13 to bend the locking member 13, and the bent portion is locally heated. As a result, as illustrated in FIG. 3C, the locking member 13 and the band member 11 are thermally welded through the sound absorbing member 12. Thus, the sound absorbing members 12 are bonded to the band member 11 by the plurality of locking members 13. While such thermal welding as described above is preferably used as the method for bonding the band member 11 and each of the sound absorbing members 12, the bonding method is not particularly limited, and an adhesive may be used, for example.

Figure 4A:
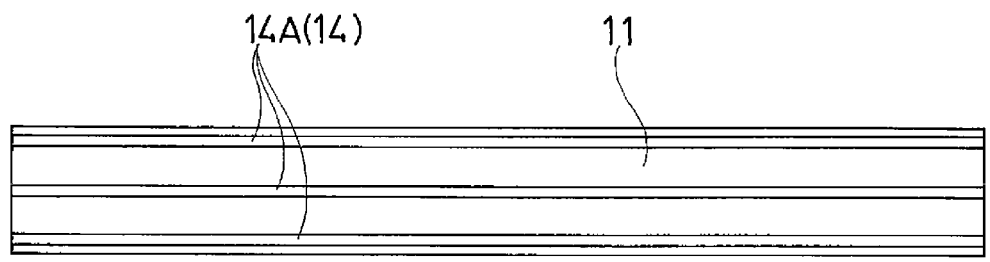
FIGS. 4A to 4C illustrate an example of the band member used in the present technology, FIG. 4A being a development view of the band member extended on a plane, FIG. 4B being a side view thereof, and FIG. 4C being a transverse cross-sectional view thereof.
Figure 4B:
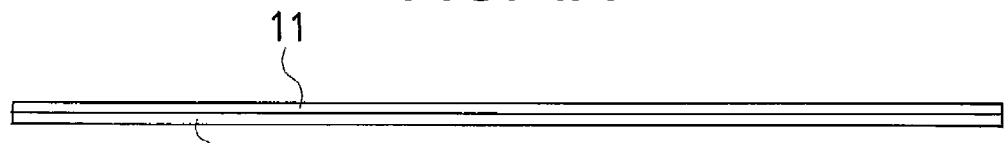
Figure 4C:
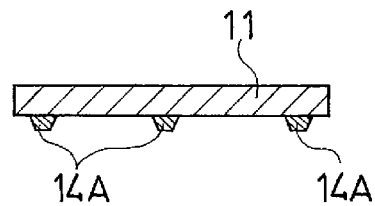

In the noise reduction device 10, at least one raised portion 14 is formed on an outer circumferential surface of the band member 11. More specifically, as illustrated in FIGS. 4A to 4C, three raised portions 14A that continuously extend in the circumferential direction (longitudinal direction) of the band member 11 are formed as the raised portion 14 on the outer circumferential surface of the band member 11. In addition, a contact area when the outer circumferential surface of the band member 11 is in contact with a smooth surface is set to be in a range of from 10% to 80% of a projected area of the band member 11.

Figure 5:
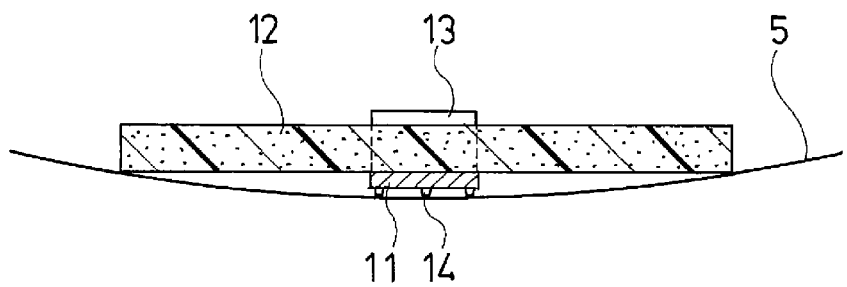
FIG. 5 is a cross-sectional view illustrating the noise reduction device according to the embodiment of the present technology installed on a tire inner surface.

In the noise reduction device 10 configured so that the sound absorbing members 12 are arranged to be fitted onto the tire inner surface 5 with the help of the elastic restoring force of the band member 11 as described above, when at least one raised portion 14 is provided on the outer circumferential surface of the band member 11 and the contact area when the outer circumferential surface of the band member 11 is in contact with a smooth surface is within the range of from 10% to 80% of the projected area of the band member 11, the contact area of the noise reduction device 10 with the tire inner surface 5 decreases, as illustrated in FIG. 5. As a result, even if heat build-up occurs in the pneumatic tire during travel, transmission of the heat from the tire inner surface 5 as well as an increase in the temperature of the band member 11 are minimized, enabling an improvement in the high speed durability of the noise reduction device 10. In particular, while in a case where the noise reduction device 10 is applied to a tire (a tire having W range or greater, for example) capable of high speed travel, presumably the band member 11 is subjected to a large tensile force from the mass of the sound absorbing members 12, and the thermoplastic resin that constitutes the band member 11 softens as heat builds up in the tire during high-speed travel, thereby causing plastic deformation; however, the increase in temperature of the band member 11 is minimized as described above, thereby minimizing the deformation of the band member 11 and making it possible to favorably retain durability.

Here, the contact area of the band member 11 when the outer circumferential surface thereof is in contact with a smooth surface needs to be in a range of from 10% to 80% of the projected area of the band member 11. When the contact area is less than 10% of the projected area, the raised portion 14 becomes more susceptible to wear, and damage readily occurs to the tire inner surface 5. Conversely, when the contact area exceeds 80% of the projected area, the effect of minimizing an increase in the temperature of the band member 10 is inadequate. In particular, the contact area of the band member 11 when the outer circumferential surface thereof is in contact with a smooth surface is preferably in a range of from 40% to 60% of the projected area of the band member 11. In this case, the improvement effect on high speed durability is remarkably achieved.

Figure 6:
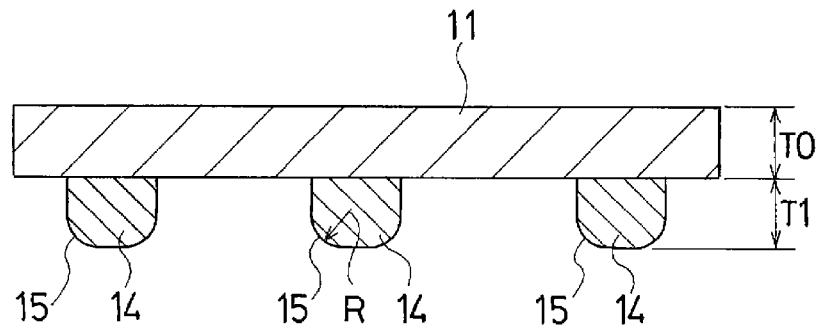
FIG. 6 is a transverse cross-sectional view illustrating a modified example of the band member used in the present technology.

In the noise reduction device 10 described above, a chamfered portion 15 formed by a curved surface is formed at an edge of the raised portion 14 that comes into contact with the tire inner surface 5, as illustrated in FIG. 6, and a radius of curvature R of the chamfered portion 15 in a cross section in the band width direction is preferably from 0.1 mm to 3.0 mm, and more preferably from 0.5 mm to 1.5 mm. This decreases the amount of damage to the tire inner surface 5 caused by contact with the raised portion 14, making it possible to improve the durability of the pneumatic tire. When the radius of curvature R of the chamfered portion 15 is less than 0.1 mm, the tire inner surface 5 becomes more susceptible to damage due to contact with the raised portion 14. Conversely, when the radius of curvature R exceeds 3.0 mm, a new edge is formed at an end portion of the chamfered portion 15, resulting in the possibility of damage to the tire inner surface 5. For similar reasons, the radius of curvature of the chamfered portion 15 in a cross section in the band circumferential direction is also preferably from 0.1 mm to 3.0 mm, and more preferably from 0.5 mm to 1.5 mm.

Further, as illustrated in FIG. 6, a height T1 of the raised portion 14 is preferably from 50% to 100% of a thickness T0 of a base portion that constitutes the band member 11. This effectively minimizes the thermal conductivity from the tire inner surface 5 to the band member 11, making it possible to further improve the high speed durability. When the height T1 of the raised portion 14 is less than 50% of the thickness T0 of the band member 11, the effect of minimizing the thermal conductivity decreases. Conversely, when the height T1 exceeds 100% of the thickness T0, the rigidity of the band member 11 increases, thereby deteriorating the durability at low temperatures and making the band member 11 more susceptible to cracking.

In forming the raised portion 14A that continuously extends in the circumferential direction of the band member 11 as the raised portion 14 on the outer circumferential surface of the band member 11, the specific embodiment is not particularly limited, allowing for a variety of embodiments such as illustrated in FIGS. 7A to 7I and FIGS. 8A to 8D, for example.

Figure 7A:
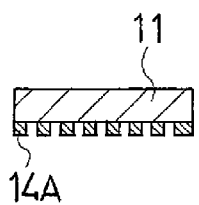
FIGS. 7A to 7I illustrate various modified examples of the band member used in the present technology, each being a transverse cross-sectional view of the corresponding band member.
Figure 7B:
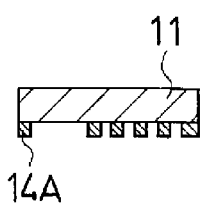
Figure 7C:
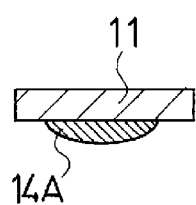
Figure 7D:
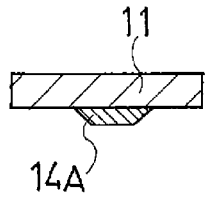
Figure 7E:
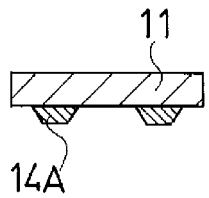
Figure 7F:
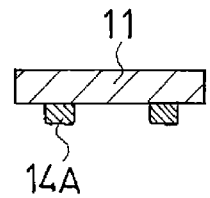
Figure 7G:
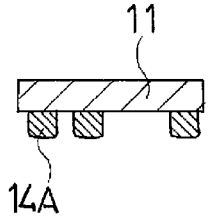
Figure 7H:
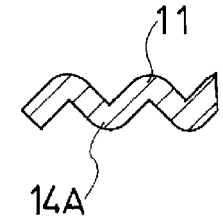
Figure 7I:
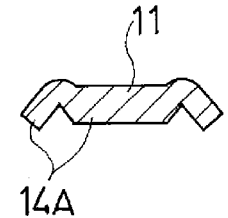

In FIG. 7A, eight raised portions 14A disposed side by side in the width direction of the band member 11 are formed on the outer circumferential surface of the band member 11. In FIG. 7B, six raised portions 14A disposed side by side in the width direction of the band member 11 are formed on the outer circumferential surface of the band member 11, and arranged asymmetrically. In FIG. 7C, one raised portion 14A having a curved surface is formed on the outer circumferential surface of the band member 11. In FIG. 7D, one raised portion 14A having a trapezoidal cross section is formed on the outer circumferential surface of the band member 11. In FIG. 7E, two raised portions 14A each having a trapezoidal cross section are formed on the outer circumferential surface of the band member 11. In FIG. 7F, two raised portions 14A each having a rectangular cross section are formed on the outer circumferential surface of the band member 11. In FIG. 7G, three raised portions 14A each having a rectangular cross section are formed on the outer circumferential surface of the band member 11, and arranged asymmetrically. In FIG. 7H, machining the base portion of the band member 11 into a wavelike shape forms the raised portion 14A that continuously extends in the circumferential direction of the band member 11 on the outer circumferential surface of the band member 11. In FIG. 7I, the raised portion 14A that continuously extends in the circumferential direction of the band member 11 is formed on the outer circumferential surface of the band member 11 by machining only both width-direction end portions of the base material of the band member 11 into a wavelike shape.

Figure 8A:
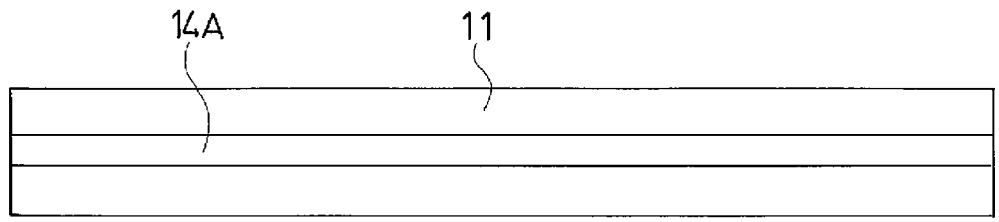
FIGS. 8A to 8D illustrate various modified examples of the band member used in the present technology, each being a development view of the corresponding band member extended on a plane.
Figure 8B:
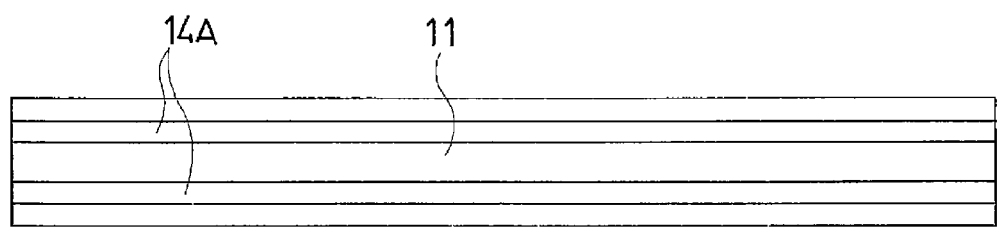
Figure 8C:
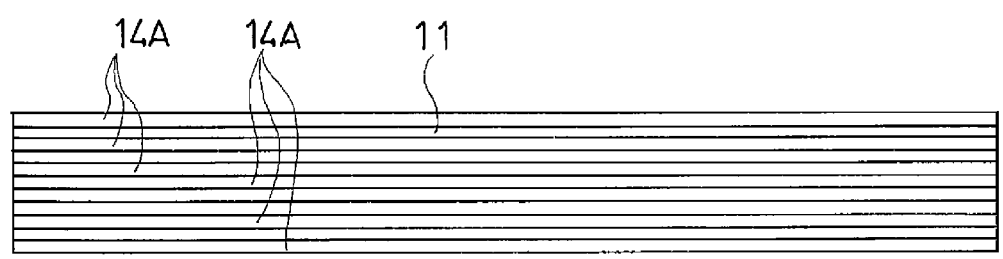
Figure 8D:
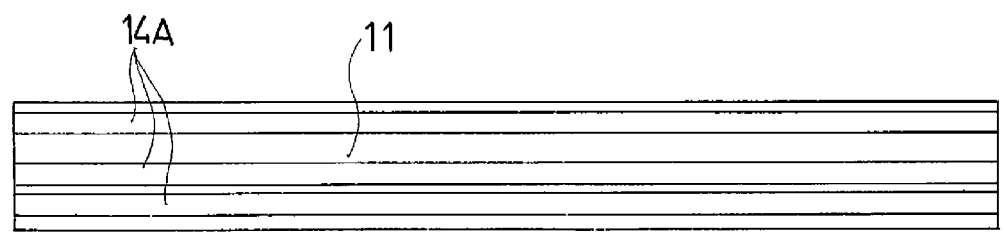

In FIG. 8A, one raised portion 14A that continuously extends in the circumferential direction of the band member 11 is formed on the outer circumferential surface of the band member 11. In FIG. 8B, two raised portions 14A that continuously extend in the circumferential direction of the band member 11 are formed on the outer circumferential surface of the band member 11. In FIG. 8C, six raised portions 14A that continuously extend in the circumferential direction of the band member 11 are formed on the outer circumferential surface of the band member 11. In FIG. 8D, three raised portions 14A that continuously extend in the circumferential direction of the band member 11 are formed on the outer circumferential surface of the band member 11 and arranged asymmetrically.

Figure 9A:
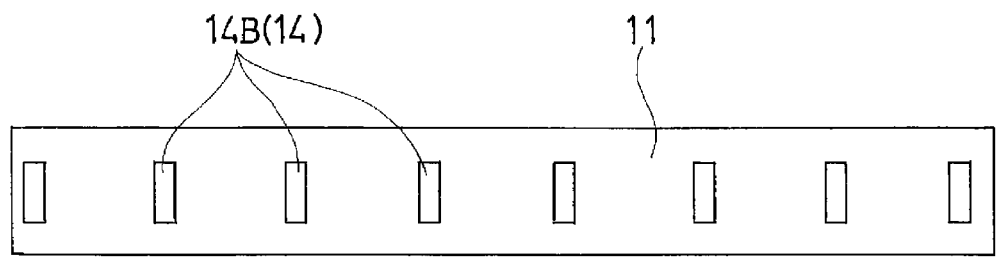
FIGS. 9A to 9C illustrate another modified example of the band member used in the present technology, FIG. 9A being a development view of the band member extended on a plane, FIG. 9B being a side view thereof, and FIG. 9C being a transverse cross-sectional view thereof.
Figure 9B:
Figure 9C:
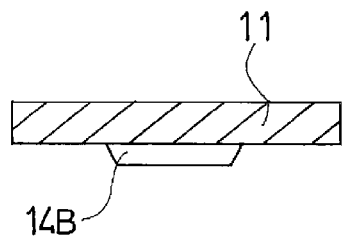

In the noise reduction device 10 described above, the plurality of raised portions 14B intermittently and repetitively disposed in the circumferential direction (longitudinal direction) of the band member 11 may be provided as the raised portion 14 on the outer circumferential surface of the band member 11, as illustrated in FIGS. 9A to 9C. In particular, when the plurality of raised portions 14B are disposed at equal intervals in the circumferential direction of the band member 11, it is possible to achieve the effect of minimizing the thermal conductivity to the maximum extent. Moreover, the contact pressure of each of the raised portions 14B is equalized, making it possible to avoid wear of the raised portions 14B and damage to the tire inner surface 5 to the extent possible.

In forming the plurality of raised portions 14B intermittently and repetitively disposed in the circumferential direction of the band member 11 as the raised portion 14 on the outer circumferential surface of the band member 11, the specific embodiment is not particularly limited, allowing for a variety of embodiments such as illustrated in FIG. 10, FIGS. 11A and 11B, and FIGS. 12A and 12B, for example.

Figure 10:
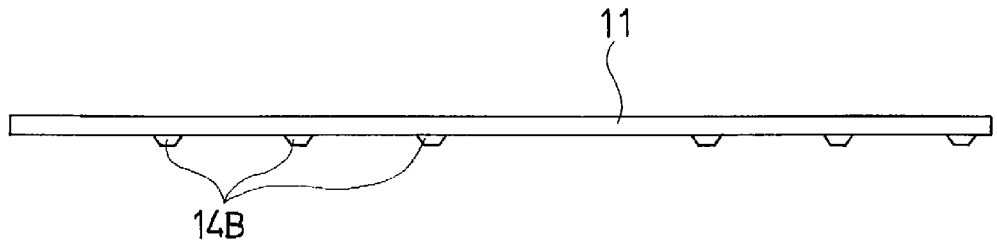
FIG. 10 is a side view illustrating another modified example of the band member used in the present technology.

In FIG. 10, the plurality of raised portions 14B disposed intermittently and repetitively in the circumferential direction of the band member 11 are formed on the outer circumferential surface of the band member 11, and disposed periodically on the basis of a predetermined pattern of arrangement.

Figure 11A:
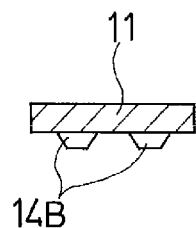
FIGS. 11A and 11B illustrate various modified examples of the band member used in the present technology, each being a transverse cross-sectional view of the corresponding band member.
Figure 11B:
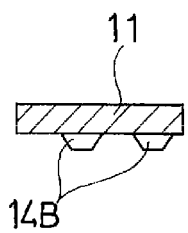

In FIG. 11A, two raised portions 14B disposed side by side in the width direction of the band member 11 are formed on the outer circumferential surface of the band member 11. In FIG. 11B, two raised portions 14B disposed side by side in the width direction of the band member 11 are formed on the outer circumferential surface of the band member 11 and arranged asymmetrically.

Figure 12A:
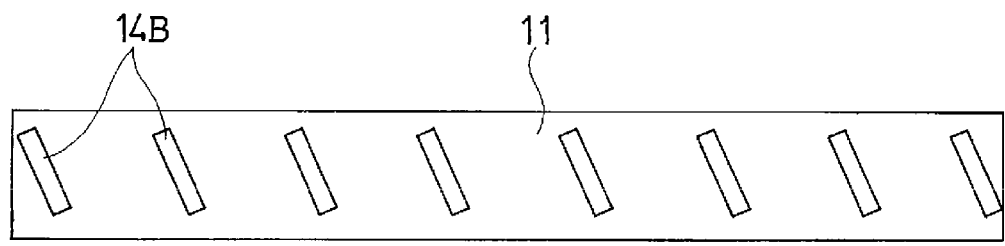
FIGS. 12A and 12B illustrate various modified examples of the band member used in the present technology, each being a development view of the corresponding band member extended on a plane.
Figure 12B:
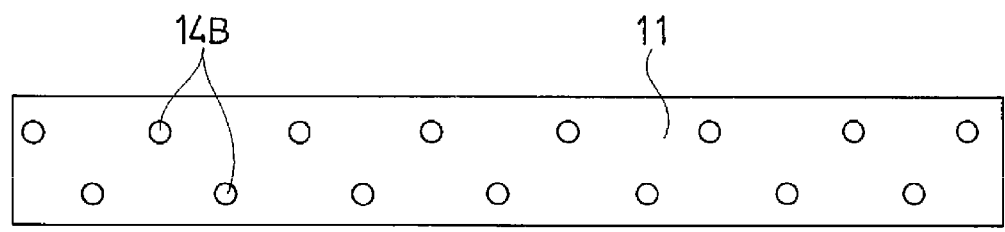

In FIG. 12A, a plurality of raised portions 14B that extend while inclining with respect to the width direction of the band member 11 are formed on the outer circumferential surface of the band member 11, and disposed intermittently and repetitively in the circumferential direction of the band member 11. In FIG. 12B, a plurality of raised portions 14B having a dimple shape are formed on the outer circumferential surface of the band member 11 and disposed in a staggered manner.

EXAMPLES

Noise reduction devices of a Conventional Example, Comparative Examples 1 to 3, and Working Examples 1 to 6 were manufactured. Each of the noise reduction devices included a band member made of a thermoplastic resin formed into a ring shape along a tire inner surface, and a sound absorbing member made of a porous material bonded to the band member. Each of the sound absorbing members was arranged to be fitted onto the tire inner surface with the help of an elastic restoring force of the band member. Each of the band members was given a different configuration. These noise reduction devices are suitable for a pneumatic tire of a tire size of 245/50R18 100 W.

In the Conventional Example (standard), the thickness of the band member was 1.0 mm, and the outer circumferential surface of the band member was a flat surface without any raised portions. In the Comparative Examples 1 and 2 and the Working Examples 1 to 6, the thickness of the band member was 1.0 mm, at least one raised portion having a height of 1.0 mm was provided on the outer circumferential surface of the band member, and various ratios of the contact area of the outer circumferential surface of the band member when in contact with a smooth surface to the projected area of the band member (ratio of the contact area to the projected area) were employed. In Comparative Example 3, the thickness of the band member was 2.0 mm, and the outer circumferential surface of the band member was a flat surface without any raised portions. Further, in providing the raised portion to the band member, a chamfered portion formed by a curved surface was formed at an edge of the raised portion that comes into contact with the tire inner surface, and the radii of curvature of the chamfered portion in a cross section in a band width direction and in a cross section in a band circumferential direction were set to predetermined values.

The noise reduction devices of the Conventional Example, Comparative Examples 1 to 3, and Working Examples 1 to 6 described above were evaluated for high speed durability, long distance durability, and low temperature durability on the basis of the evaluation methods below. Results are shown in Table 1.

High-Speed Durability:

Each of the noise reduction devices was fitted onto a cavity portion of a pneumatic tire with a tire size of 245/50R18 100 W. Each pneumatic tire was then assembled to a wheel having a rim size of 18×8 J, and a traveling test was conducted under the conditions of an ambient temperature of 38±3° C., an air pressure of 320 kPa, and a load of 5.34 kN using an indoor drum testing machine. Starting from a traveling speed of 250 km/h, each test tire was made to travel continuously for 10 minutes at that speed, and the band member was examined for a fracture (deformation). In a case where no abnormalities were found, the traveling speed was then increased in increments of 10 km/h and, after further continuous travel at that speed for 10 minutes, the band member was examined for a fracture. This test was repeated, and the speed at which a fracture occurred in each band member was found. The evaluation results were expressed by the fracture speed of each band member. Larger fracture speeds indicate superior high-speed durability.

Long Distance Durability:

Each of the noise reduction devices was fitted into the cavity portion of a pneumatic tire with a tire size of 245/50R18 100 W. Each pneumatic tire was then assembled to a wheel having a rim size of 18×8 J, and a traveling test was conducted under the conditions of an ambient temperature of 38±3° C., an air pressure of 540 kPa, a load of 12.56 kN, and a travel speed of 81 km/h using an indoor drum testing machine. Then, after 20,000 km of travel, the state of the pneumatic tire and the state of the noise reduction device were checked. The evaluation result was indicated as A in a case where no problem was found in either the pneumatic tire or the noise reduction device, B in a case where damage was found on the band member, and C in a case where either wear on the raised portion(s) of the band member or damage to the tire inner surface was found.

Low-Temperature Durability:

Each of the noise reduction devices was fitted into the cavity portion of a pneumatic tire with a tire size of 245/50R18 100 W. Each pneumatic tire was then assembled to a wheel having a rim size of 18×8 J, and a traveling test was conducted under the conditions of an ambient temperature of −20±3° C., an air pressure of 120 kPa, a load of 5.95 kN, and a travel speed of 81 km/h using an indoor drum testing machine. Then, after 2,025 km of travel, the state of the noise reduction device was checked. The evaluation result was indicated as A in a case where no problem was found in the noise reduction device, B in a case where cracking occurred on the band member, and C in a case where either wear on the raised portion(s) of the band member or damage to the tire inner surface was found.

TABLE 1

|  | Conventional Example | Comparative Example 1 | Working Example 1 | Working Example 2 | Working Example 3 |
|---|---|---|---|---|---|
| Ratio (%) of contact area to projected area of band member | 100 | 5 | 10 | 40 | 60 |
| Thickness of band member (mm) | 1.0 | 1.0 | 1.0 | 1.0 | 1.0 |
| Height (mm) of raised portion | — | 1.0 | 1.0 | 1.0 | 1.0 |
| Radius of curvature of edge of raised portion (mm) | — | 1.5 | 1.5 | 1.5 | 0.1 |
| High-speed durability (Defect speed: km/h) | 270 | 280 | 290 | 300 | 300 |
| Long distance durability | C | A | A | A | A |
| Low-temperature durability | A | A | A | A | A |

|  | Working Example 4 | Working Example 5 | Working Example 6 | Comparative Example 2 | Comparative Example 3 |
|---|---|---|---|---|---|
| Ratio (%) of contact area to projected area of band member | 60 | 60 | 80 | 90 | 100 |
| Thickness of band member (mm) | 1.0 | 1.0 | 1.0 | 1.0 | 2.0 |
| Height (mm) of raised portion | 1.0 | 1.0 | 1.0 | 1.0 | — |
| Radius of curvature of edge of raised portion (mm) | 1.5 | 3.0 | 1.5 | 1.5 | — |
| High-speed durability (Defect speed: km/h) | 300 | 300 | 290 | 280 | 280 |
| Long distance durability | A | A | A | A | A |
| Low-temperature durability | A | A | A | B | B |

As shown in Table 1, in the noise reduction devices of Working Examples 1 to 6, both the long distance durability and low temperature durability were favorable, and the high speed durability improved in comparison to the Conventional Example. In contrast, in Comparative Example 1, the ratio of contact area to projected area of the band member was too small, resulting from too small raised portion(s). Thus, wear on the raised portion(s) or damage to the tire inner surface was found. In Comparative Example 2, the ratio of contact area to projected area of the band member was too large, resulting from too large raised portion(s). Thus, the improvement effect on high speed durability was inadequate, and a low temperature durability was reduced. In Comparative Example 3, the band member was simply increased in thickness without providing a raised portion on the outer circumferential surface of the band member, resulting in an inadequate improvement effect on high speed durability and a reduction in low temperature durability.

The invention claimed is:

1. A noise reduction device comprising:
   a band member made of a thermoplastic resin formed into a ring shape along a tire inner surface; and
   a sound absorbing member made of a porous material bonded to the band member, the sound absorbing member being arranged to be fitted onto the tire inner surface with the help of an elastic restoring force of the band member;
   the band member comprising at least one raised portion provided on an outer circumferential surface thereof;
   the band member having a narrower width in a tire width direction than a width of the sound absorbing member; and
   the outer circumferential surface of the band member having a contact area when in contact with a smooth surface in a range of from 10% to 80% of a projected area of the band member.

2. The noise reduction device according to claim 1, further comprising a chamfered portion formed by a curved surface at an edge of the raised portion that comes into contact with the tire inner surface, the chamfered portion having a radius of curvature in a cross section in a band width direction and a radius of curvature in a cross section in a band circumferential direction of from 0.1 mm to 3.0 mm.

3. The noise reduction device according to claim 1, wherein the raised portion includes at least one raised portion that continuously extends in the circumferential direction of the band member.

4. The noise reduction device according to claim 1, wherein the raised portion includes a plurality of raised portions disposed intermittently and repetitively in the circumferential direction of the band member.

5. The noise reduction device according to claim 1, wherein the raised portion includes a plurality of raised portions disposed side by side in a width direction of the band member.

6. The noise reduction device according to claim 1, wherein a height of the raised portion is from 50% to 100% of a thickness of a base portion constituting the band member.

7. The noise reduction device according to claim 1, wherein the sound absorbing member is disposed between the band member and a locking member made of a thermoplastic resin, and the locking member is thermally welded to the band member through the sound absorbing member, thereby fixing the sound absorbing member to the band member.

8. A pneumatic tire comprising the noise reduction device described in claim 1 arranged in a cavity portion.

9. The noise reduction device according to claim 2, wherein the raised portion includes at least one raised portion that continuously extends in the circumferential direction of the band member.

10. The noise reduction device according to claim 9, wherein the raised portion includes a plurality of raised portions disposed side by side in a width direction of the band member.

11. The noise reduction device according to claim 10, wherein a height of the raised portion is from 50% to 100% of a thickness of a base portion constituting the band member.

12. The noise reduction device according to claim 11, wherein the sound absorbing member is disposed between the band member and a locking member made of a thermoplastic resin, and the locking member is thermally welded to the band member through the sound absorbing member, thereby fixing the sound absorbing member to the band member.

13. A pneumatic tire comprising the noise reduction device described in claim 12 arranged in a cavity portion.

14. The noise reduction device according to claim 2, wherein the raised portion includes a plurality of raised portions disposed intermittently and repetitively in the circumferential direction of the band member.

15. The noise reduction device according to claim 14, wherein the raised portion includes a plurality of raised portions disposed side by side in a width direction of the band member.

16. The noise reduction device according to claim 15, wherein a height of the raised portion is from 50% to 100% of a thickness of a base portion constituting the band member.

17. The noise reduction device according to claim 16, wherein the sound absorbing member is disposed between the band member and a locking member made of a thermoplastic resin, and the locking member is thermally welded to the band member through the sound absorbing member, thereby fixing the sound absorbing member to the band member.

18. A pneumatic tire comprising the noise reduction device described in claim 17 arranged in a cavity portion.

* * * * *